United States Patent [19]
Brown et al.

[11] Patent Number: 6,114,877
[45] Date of Patent: Sep. 5, 2000

[54] TIMING CIRCUIT UTILIZING A CLOCK TREE AS A DELAY DEVICE

[75] Inventors: C. Allen Brown; Damir Smitlener, both of Corvallis, Oreg.

[73] Assignee: Agilent Technologies, Inc., Palo Alto, Calif.

[21] Appl. No.: 09/090,678

[22] Filed: Jun. 3, 1998

[51] Int. Cl.[7] .................................................. G03B 13/18
[52] U.S. Cl. .............................. 326/96; 326/93; 326/101; 327/293; 327/295
[58] Field of Search ............................... 326/93, 96, 101; 327/291, 293, 295

[56] References Cited

U.S. PATENT DOCUMENTS

| | | |
|---|---|---|
| 5,023,893 | 6/1991 | Leung et al. . |
| 5,124,571 | 6/1992 | Gillingham et al. . |
| 5,172,330 | 12/1992 | Watanabe et al. . |
| 5,430,397 | 7/1995 | Itoh et al. ................................ 327/295 |
| 5,517,147 | 5/1996 | Burroughs et al. ..................... 327/295 |
| 5,532,633 | 7/1996 | Kawai . |
| 5,617,047 | 4/1997 | Henkels et al. ......................... 327/295 |
| 5,635,857 | 6/1997 | Flora ........................................ 326/93 |
| 5,638,542 | 6/1997 | Nikjou . |
| 5,717,229 | 2/1998 | Zhu . |

Primary Examiner—Jon Santamauro

[57] ABSTRACT

A timing circuit that utilizes the delay inherent in a clock tree to achieve a desired timing relationship between control or clock signals. The timing circuit is particularly applicable to high speed environments and to asynchronous logic, though it is also applicable to lower speed environments and synchronous logic. A method producing the desired control or clock signals is also disclosed.

17 Claims, 1 Drawing Sheet

TIMING CIRCUIT UTILIZING A CLOCK TREE AS A DELAY DEVICE

FIELD OF THE INVENTION

The present invention relates to clock signals in digital circuits and, more specifically, to providing a desired relationship between two clock signals.

BACKGROUND OF THE INVENTION

Integrated circuit technologies have continually advanced producing chips that perform more logic operations per unit area and at higher operating speeds. The increased capability of integrated circuits has also created a need for more accurate control of the relationship of various clock or control signals. For example, it may be required in a high speed environment that a second clock signal is delayed a certain amount relative to a first clock signal so that data gated by the first clock signal is in an appropriate state upon the triggering edge of the second clock signal. It may also be required, for example, in the case of asynchronous RAM and two phase latch based design, that one control signal transitions from a given state and returns to that state, while a related control signal does not transition. This relationship is sometimes referred to as "non-overlapping."

One prior art attempt to delay a second clock signal relative to a first clock signal has been to use a latch (flip-flop) to induce a desired delay. Problems with such an approach include that when you are dealing with a high speed clock or control signal, there is no other high speed signal available to gate signals through the latch.

Another prior art attempt to control one clock signal relative to another includes insertion of an analog delay device between the clock signals. Problems with this approach, however, include that the amount of actual delay induced by an analog delay device is quite variable and further that analog delay devices are not part of conventional (digital-based) integrated circuit design tools. A need thus exists for an efficient, practical manner of providing a predefined relationship between multiple clock or control signals in an integrated circuit environment. This need exists for both overlapping and non-overlapping signals.

SUMMARY OF THE INVENTION

Accordingly, it is an object of the present invention to provide a timing or control circuit that creates a predefined relationship between multiple clock signals.

It is another object of the present invention to provide a timing or control circuit that achieves such a predefined relationship utilizing the inherent delay of drivers in a clock tree.

It is another object of the present invention to provide such a timing circuit that affords an overlapping or non-overlapping relationship between output signals.

These and related objects of the present invention are achieved by use of a timing circuit utilizing a clock tree as a delay device as described herein.

In one embodiment, the present invention includes an input; a delay device coupled to said input that is implemented as a first clock tree and produces a first clock tree output signal; a combining circuit that combines a signal from said input and said first clock tree output signal in such a manner as to produce a combined signal that has a defined temporal relationship with said first clock tree output signal; and functional logic coupled to said delay device and said combining circuit that receives said first clock tree output signal and said combined signal. This embodiment may further comprise a second clock tree coupled to said combining circuit that receives said combined signal and distributes said combined signal as a second clock tree output signal; wherein said second clock tree output signal and said first clock tree signal have a defined temporal relationship. The first and second clock tree may be configured to impart delays that cause the first and second clock tree output signals to be non-overlapping or overlapping. The functional logic may be asynchronous RAM or other asynchronous or synchronous logic.

In another embodiment, the present invention includes a control signal input, said input being configured to propagate a received control signal on at least a first and a second path; a first clock tree coupled to said first path that generates a first clock tree output signal; a second clock tree coupled to said second path that generates a second clock tree output signal; and functional logic that is controlled by said first clock tree output signal and said second clock tree output signal; wherein said first clock tree output signal and said second clock tree output signal have a defined temporal relationship therebetween.

The present invention also includes a method of providing first and second control signals that have the relationship and are generated as described herein.

The attainment of the foregoing and related advantages and features of the invention should be more readily apparent to those skilled in the art, after review of the following more detailed description of the invention taken together with the drawings.

DETAILED DESCRIPTION

Figure 1:
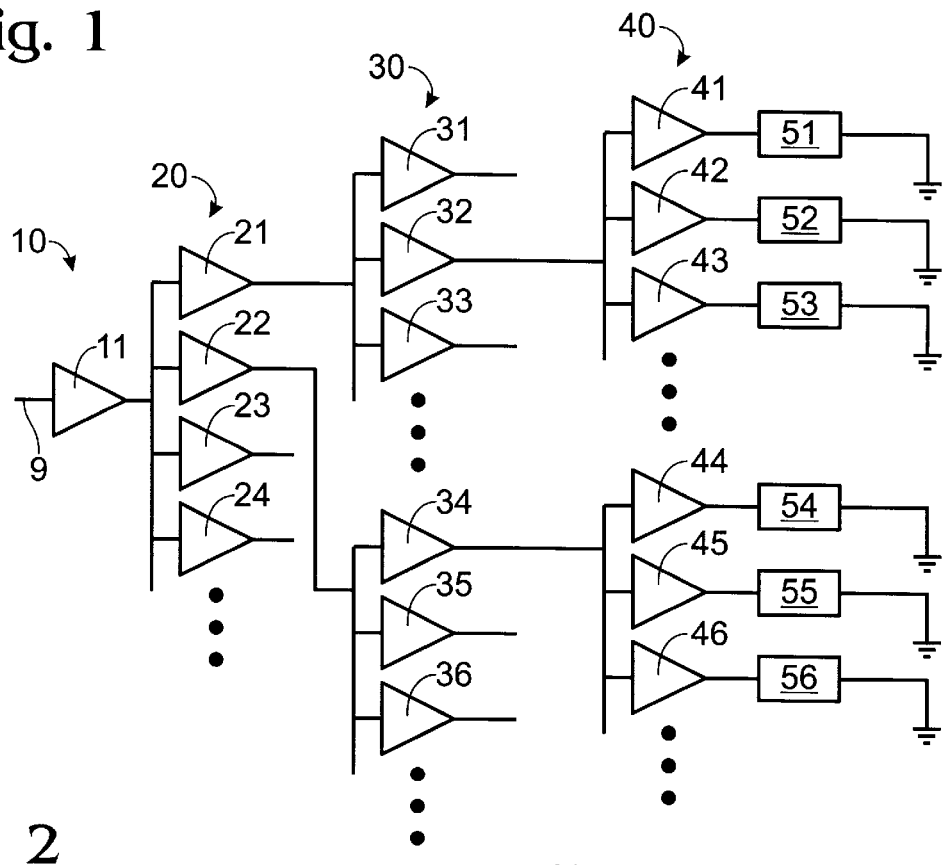
FIG. 1 is a schematic block diagram of a clock tree.

Referring to FIG. 1, a schematic block diagram of a clock tree 5 is shown. An input clock signal is delivered over line 9 to a first stage (10) buffer driver (hereinafter referred to as a "driver") 11. The output of driver 11 is delivered to a plurality of second stage (20) drivers. While four are shown (21–24), it should be recognized that this number can be larger or smaller depending on known fanout or load determining factors such as impedance and conductor length, etc, and the number of destinations to be fed, amongst other considerations. The outputs of the second stage drivers are in turn coupled to the input of third stage (30) drivers 31–36, and the third stage drivers are similarly coupled to fourth stage (40) drivers 41–46.

In the illustrated embodiment, clock signals output from the fourth stage are delivered to their destinations (functional logic) which are represented as loads 51–56. It should be recognized that the number of stages and the number of drivers within each stage is dependent upon the number of locations to which the clock signals need be delivered and the fanout ability of each driver, etc., as is generally known.

Each stage within clock tree 10 induces a certain amount of delay in a clock signal propagating therethrough due to factors such as parasitic capacitance and inductance, load considerations and the inherent properties of semiconductor material, etc. Also, the amount of delay induced by one driver may be different from that induced by another resulting in clock signal that do not transition at exactly the same time. This difference is generally referred to as clock "skew" and, for example, in FIG. 3 (discussed below) the clock skew in the clock tree output signals is indicated as a period or band during which the signal transition may occur.

Figure 2:
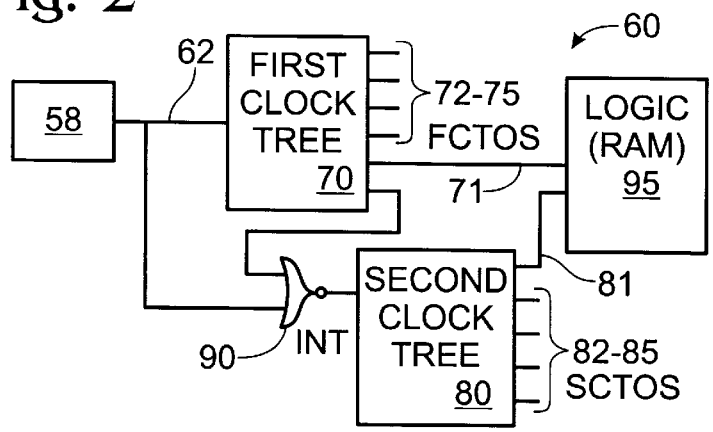
FIG. 2 is a schematic block diagram of a timing or control circuit in accordance with the present invention.

Referring to FIG. 2, a schematic block diagram of a clock or control signal circuit 60 in accordance with the present invention is shown. Clock circuit 60 receives a clock signal over line 62 and generates therefrom at least a first and a second clock signal having a predefined temporal relationship. The input clock signal is provided by a clock source 58 that may be a crystal oscillator or other known source. Source 58 may be located on or off an integrated circuit in which circuit 60 is provided.

Circuit 60 preferably includes a first clock tree 70 and a second clock tree 80. First and second clock trees 70,80 are generally analogous to clock tree 10 described above with reference to FIG. 1, though the number of stages and the number of drivers per stage may be more or less than illustrated in FIG. 1.

The input clock signal on line 62 is propagated to a first clock tree 70 from which it is output over a plurality of output lines, a representative five of which are shown 71–75. The input clock signal is also input to combinational logic 90. Combinational logic 90 preferably includes a NOR gate or the like and combines the input clock signal and an output of first clock tree 70 to produce an intermediate signal. It should be recognized that the use of a NOR gate or other combinational logic is dependent on and may vary in accordance with the active state of logic within an integrated circuit as is generally known. It should also be recognized that the output of the first clock tree that is propagated to combinational logic 90 may be taken at any appropriate stage of clock tree 70 and thus line 71 need not propagate a signal that is of the same stage as one or more of the signals output on lines 72–75.

The output of combinational logic 90 is input to second clock tree 80 from which it is output over a plurality of lines, a representative 5 of which are shown (81–85). Signals output from the second clock tree have a predefined relationship relative to those output from the first clock tree.

A first clock tree output signal is propagated on line 71 to logic 95 and a second clock tree output signal is propagated over line 81 to logic 95. Logic 95 can be any logic that requires signals having a relationship as discussed herein, particularly with reference to FIG. 3. In a preferred embodiment, logic 95 is asynchronous RAM and the first and second clock tree output signals provide appropriate control of address and control signal gating. Alternatively, logic 95 may be two stage latch based design logic or the like or yet some other logic.

Figure 3:
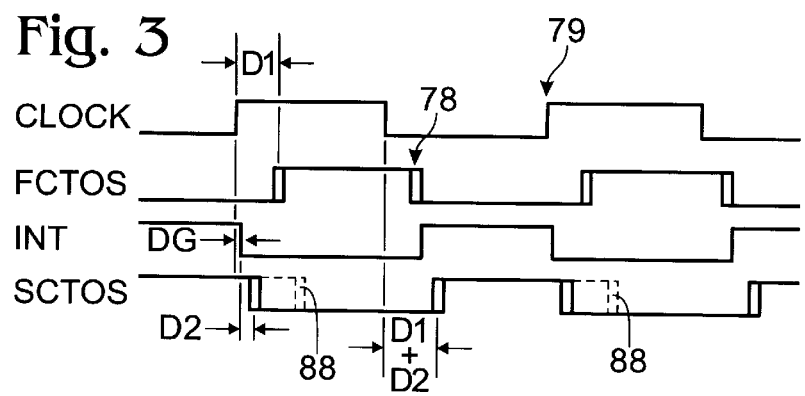
FIG. 3 is a timing diagram of signals in the clock or control circuit of FIG. 2 in accordance with the present invention.

Referring to FIG. 3, a timing diagram of signals in clock circuit 60 in accordance with the present invention is shown. The diagram of FIG. 3 illustrates the input clock signal (defines as "CLOCK"), the signal output from clock tree 70 (termed the first clock tree output signal and identified as "FCTOS"), the signal output from combinational logic 90 (identified as "INT" for intermediate signal) and the signal output from second clock tree 80 (termed the second clock tree output signal and identified as "SCTOS"). The FCTOS is a first clock tree delayed version of the input clock, while the SCTOS is a second clock tree delayed version of the intermediate or combinational logic output signal. The use of a NOR gate or like combinational logic causes the SCTOS to be substantially inverted compared to the FCTOS. The amount of delay induced by each clock tree includes the inherent delay induced by the clock tree components and design (as discussed above) and the location at which the clock signal is taken off of the respective tree. The delay induced by the first clock tree is designated D1, while the delay induced by the second clock tree is designated D2.

It can be seen from FIG. 3 that as the input clock signal goes high, the intermediate clock signal is driven low (the inverse of the clock signal). After delay D1, the FCTOS follows the clock signal and after delay D2, the SCTOS follows the intermediate signal. The delay D1 may be greater or less than D2, or the two delays may be approximately equal, depending on a particular application.

In the embodiment of FIG. 3, D2 is shown as being less than D1. Dashed lines 88 illustrate the SCTOS when D2 is greater than D1. When D2 is less than D1, the FCTOS and SCTOS are non-overlapping, whereas when D2 is greater than D1 the FCTOS and SCTOS are overlapping.

When the input clock signal drops low, the intermediate signal is not immediately driven high, but is gated by the FCTOS at time period 78. In response to the FCTOS transition to a low state, the intermediate signal is driven high which in turn drives the SCTOS high (after delay D2). At point 79 the input clock signal again transitions high causing the cycle to repeat. Amongst other features, it should be recognized that the SCTOS is D1 plus D2 behind the input clock and that if D2 is less than D1 then the SCTOS goes high and transitions low again while the FCTOS is low (i.e., non-overlapping), whereas if D2 is greater than D1 the SCTOS returns to a logic low state after the FCTOS has transitions high (i.e., overlapping). It should also be recognized that the INT signal will always be delayed by the amount of delay induced by combinational logic 90, designated DG for delay of gate.

While the signals in FIG. 3 are shown with their preferred polarity (or logic state), it should be recognized that achieving the same functionality, albeit with different polarity (or logic state), is contemplated by the applicants, within the ability of one skilled in the art given the teachings herein and intended to be within the present invention.

The FCTOS and the SCTOS are propagated to functional logic 90 as discussed above. There the two signals provide control or clock signals having a predetermined relationship therebetween, the relationship being a function of the inherent delay of the respective clock trees.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A timing circuit, comprising:

control logic that receives as input a clock signal that transitions from high to low and from low to high at regular intervals and produces from that clock signal a first output signal delayed relative to the input clock signal and a second output signal delayed relative to the input clock signal, said first output signal transitioning from high to low and low to high at regular intervals and said second output signal transitioning from high to low and low to high at regular intervals;

said control logic including a first clock tree and a second clock tree, an output of said first clock tree serving as an input to said second clock tree and said first output signal coming from said first clock tree and said second output signal coming from said second clock tree;

wherein the delay of said first and second output signals from the input clock signal and the timing relationship of the transitions of the first and second output signals relative to one another are induced substantially by the delay inherent in the respective clock trees from which they are generated; and further wherein the configuration of the control logic and the relative relationship of the first and second output signals is such that an active transition of each of the first and second output signals does not occur at the same time.

2. The timing circuit of claim 1, further comprising combinational logic coupled to the input of said second clock tree that combines the input clock signal with an output of the first clock tree.

3. The timing circuit of claim 1, wherein the configuration of the control logic and the relative relationship of the first and second output signals is such that the first output signal and the second output signal transition in a non-overlapping manner.

4. The timing circuit of claim 1, wherein the configuration of the control logic and the relative relationship of the first and second output signals is such that the first output signal and the second output signal transition in an overlapping manner.

5. The timing circuit of claim 2, wherein said first and second clock trees and said combinational logic are implemented in an application specific integrated circuit.

6. The timing circuit of claim 2, wherein the configuration of the control logic and the relative relationship of the first and second output signals is such that the first output signal and the second output signal transition in a substantially inverted manner.

7. The timing circuit of claim 6, wherein said substantially inverted relationship is achieved in large part by said combinational logic.

8. The timing circuit of claim 1, further comprising asynchronous RAM to which said first and second output signals are propagated, and wherein the staggered relationship of the first and second output signals permits one of said output signals to setup address and control signals for the asynchronous RAM and the other of said output signals to latch these signals through to the RAM.

9. A control circuit, comprising:

a control signal input, said input being configured to propagate a received control signal on at least a first and a second path;

a first clock tree coupled to said first path that generates a first clock tree output signal;

a second clock tree coupled to said second path that generates a second clock tree output signal; and functional logic that receives as input said first clock tree output signal and said second clock tree output signal;

wherein said first clock tree output signal and said second clock tree output signal have a defined temporal relationship therebetween, such that corresponding active transitions of the first and second clock tree output signals occur one before the other.

10. The control circuit of claim 9, wherein said defined temporal relationship is a non-overlapping relationship.

11. The control circuit of claim 9, further comprising combining logic having an output coupled to the input of said second clock tree and that receives as inputs a clock signal from said control signal input and a signal output from said first clock tree.

12. The control circuit of claim 11, wherein said first and second clock tree output signals have a substantially inverted relationship and that relationship is induced in large part by said combinational logic.

13. The control circuit of claim 9, wherein said functional logic includes asynchronous memory logic and wherein the staggered relationship of the first and second clock tree output signals permits one of said output signals to setup address and control signals for the asynchronous memory logic and the other of said output signals to latch these signals through to the asynchronous memory logic.

14. A method of controlling functional logic in an integrated circuit, comprising the steps of:

providing control logic including a first clock tree and a second clock tree;

receiving as input to said control logic a clock signal that transitions from high to low and from low to high at regular intervals and producing from that clock signal a first output signal delayed relative to the input clock signal and a second output signal delayed relative to the input clock signal, said first output signal transitioning from high to low and low to high at regular intervals and said second output signal transitioning from high to low and low to high at regular intervals, said first output signal coming from said first clock tree and said second output signal coming from said second clock tree; and inputting an output of said first clock tree to said second clock tree to affect generation of said second output signal;

wherein the delay of said first and second output signals from the input clock signal and the timing relationship of the transitions of the first and second output signals relative to one another are induced substantially by the delay inherent in the respective clock trees from which they are generated;

further wherein the configuration of the control logic and the relative relationship of the first and second output signals is such that an active transition of each of the first and second output signals does not occur at the same time.

15. The method of claim 14, further comprising the step of combining with combinational logic the input clock signal and the output from said first clock tree before input to the second clock tree.

16. The method of claim 14, further comprising the step of configuring said first output signal and said second output signal to have a non-overlapping relationship.

17. The method of claim 14, further comprising the step of controlling the same asynchronous logic with said first and second output signals where one of said staggered output signals provides data setup and the other signal provides passage of the data through to the asynchronous logic once the data is setup.

* * * * *